United States Patent
Kudo et al.

(10) Patent No.: US 8,840,259 B2
(45) Date of Patent: Sep. 23, 2014

(54) MIRROR DEVICE FOR VEHICLE

(75) Inventors: Nobuhiro Kudo, Aichi-ken (JP); Isao Sumi, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 191 days.

(21) Appl. No.: 13/305,241

(22) Filed: Nov. 28, 2011

(65) Prior Publication Data

US 2012/0134040 A1    May 31, 2012

(30) Foreign Application Priority Data

Nov. 30, 2010   (JP) .................................. 2010-267555

(51) Int. Cl.
*G02B 7/182*   (2006.01)
*B60R 1/072*   (2006.01)

(52) U.S. Cl.
CPC ...................................... *B60R 1/072* (2013.01)
USPC .......................................................... 359/877

(58) Field of Classification Search
USPC .............. 359/838–883; 701/49; 248/476–477
See application file for complete search history.

(56) References Cited

U.S. PATENT DOCUMENTS

2005/0030655 A1 *   2/2005   Tsuyama ...................... 359/878

FOREIGN PATENT DOCUMENTS

| JP | 08-175267    | 7/1996 |
| JP | 11-255025    | 9/1999 |
| JP | 2005-28958 A | 2/2005 |
| WO | 2006040799 A1 | 4/2006 |

OTHER PUBLICATIONS

JP Office Action dated Apr. 8, 2014 and English translation of Notice of Reasons for rejection.

\* cited by examiner

*Primary Examiner* — Jennifer L. Doak
(74) *Attorney, Agent, or Firm* — Roberts Mlotkowski Safran & Cole P.C.

(57) ABSTRACT

Motor bodies are housed between a case and a case-inner, with the whole of the outside-periphery surrounded by an outer peripheral wall. The upper-side-outer-peripheral face of the outer-peripheral wall slopes continuously downwards on progression from an uppermost portion of the outer-peripheral face towards a vehicle right side edge of the outer-peripheral face, and slopes continuously downwards from the uppermost portion towards the vehicle left side edge of the outer-peripheral face. Accordingly, even suppose water is to reach the upper side of the upper-side-outer-peripheral face, the upper-side-outer peripheral face of the outer-peripheral wall causes such water to always flow downwards towards the lower side of the outer-peripheral wall, and hence water can be suppressed or prevented from remaining standing on the upper-side-outer peripheral face of the outer-peripheral wall 46, enabling water to be suppressed or prevented from seeping in to the motor bodies.

15 Claims, 6 Drawing Sheets

MIRROR DEVICE FOR VEHICLE

CROSS-REFERENCE TO RELATED APPLICATION

This application claims priority under 35 USC 119 from Japanese Patent Application No. 2010-267555 filed Nov. 30, 2010, the disclosure of which is incorporated by reference herein.

BACKGROUND OF THE INVENTION

1. Field of the Invention

The present invention is related to a mirror device for a vehicle in which a mirror face angle of a mirror is adjusted by driving a motor.

2. Related Art

In a mirror tilting unit described in Japanese Patent Application Laid-Open (JP-A) No. 11-255025, a drive motor housing cavity is formed inside a base housing, and the drive motor housing indentation cavity is covered by a motor cover. A drive motor is housed between the drive motor housing cavity and the motor cover. A mirror body is tilted by driving the drive motor.

However, in the mirror tilting unit it is not disclosed which peripheral location on the base housing is facing upwards in a state where it is mounted to the vehicle. Accordingly, depending on which peripheral location of the base housing is facing upwards when it is mounted to the vehicle, water from the upper side of the drive motor housing cavity and motor cover is not caused to flow downwards on the peripheral wall in the drive motor cavity and motor cover, but remains thereat. Accordingly there is a possibility that such water seeps onto the drive motor from between the drive motor housing cavity and the motor cover.

SUMMARY OF THE INVENTION

In consideration of the above circumstances the present invention is directed towards obtaining a mirror device for a vehicle capable of suppressing liquid from the upper side of an outer peripheral wall from remaining standing on the outer peripheral wall.

A mirror device for a vehicle of a first aspect of the present invention includes: a mirror provided to a vehicle; a pair of motors that adjust a mirror-face angle of the mirror by driving; a pair of housing members that fit together to internally house the pair of motors; and an outer peripheral wall provided at a fitting portion of the pair of housing members, that surrounds an outside periphery of the pair of motors, an outer peripheral face of the outer peripheral wall sloping continuously downwards along a peripheral direction from an uppermost portion thereof on progression towards end edges thereof in plan view.

A mirror device for a vehicle of a second aspect of the present invention is the mirror device for a vehicle of the first aspect wherein: the outer peripheral wall is placed in a right hand side mounting orientation in a case in which the mirror is employed at a vehicle right hand side, and the outer peripheral wall is placed in a left hand side mounting orientation in a case in which the mirror is employed at a vehicle left hand side; and the outer peripheral face of the outer peripheral wall slopes continuously downwards on progression along the peripheral direction from the uppermost portion towards the end edges in plan view in cases where the outer peripheral wall is placed in the right hand side mounting orientation and where the outer peripheral wall is placed in the left hand side mounting orientation.

A mirror device for a vehicle of a third aspect of the present invention is the mirror device for a vehicle of the first aspect or the second aspect wherein the outer peripheral wall includes: an upper covering portion that covers an upper side of one of the motors that is disposed at an upper location; and a lower covering portion that covers an upper side of the other of the motors that is disposed at a lower location, the lower covering portion being communicated to a lower side of the upper covering portion, wherein downwards angle of slope of the outer peripheral face is greater at the lower covering portion than at the upper covering portion.

A mirror device for a vehicle of a fourth aspect of the present invention is the mirror device for a vehicle of the third aspect wherein: the outer peripheral wall is placed in a right hand side mounting orientation in a case in which the mirror is employed at a vehicle right hand side, and the outer peripheral wall is placed in a left hand side mounting orientation in a case in which the mirror is employed at a vehicle left hand side; and the downwards angle of slope of the outer peripheral face is greater at the lower covering portion than at the upper covering portion in the cases in which the outer peripheral wall is placed in the right hand side mounting orientation and where the outer peripheral wall is placed in the left hand side mounting orientation.

A mirror device for a vehicle of a fifth aspect of the present invention is the mirror device for a vehicle of any one of the first to the fourth aspects further including: rotation gears provided at an upper side of the outer peripheral wall, that are rotated by driving of the motors so as to adjust the mirror-face angle of the mirror; and a restriction wall provided at an upper side of the rotation gears, that restricts downwards flow of a liquid onto the rotation gears and the outer peripheral wall.

A mirror device for a vehicle of a sixth aspect of the present invention is the mirror device for a vehicle of the fifth aspect wherein a gap through which the liquid passes is provided between the outer peripheral wall and the restriction wall.

A mirror device for a vehicle of a seventh aspect of the present invention is the mirror device for a vehicle of any one of the first to the sixth aspects further including: rotation gears that are rotated by driving of the motors so as to adjust the mirror-face angle of the mirror; and a stopper portion that stops movement of one of the rotation gears and has a peripheral face that slopes continuously downwards on progression along a peripheral direction from an uppermost portion of the stopper portion towards an end edge of the stopper portion in plan view.

A mirror device for a vehicle of an eighth aspect of the present invention is the mirror device for a vehicle of the seventh aspect wherein: the stopper portion is placed in a right hand side mounting orientation in a case in which the mirror is employed at a vehicle right hand side, and the stopper portion is placed in a left hand side mounting orientation in a case in which the mirror is employed at a vehicle left hand side; and the peripheral face of the stopper portion slopes continuously downwards on progression along the peripheral direction from the uppermost portion of the stopper portion towards the end edge of the stopper portion in plan view in the cases in which the stopper portion is placed in the right hand side mounting orientation and in which the stopper portion is placed in the left hand side mounting orientation.

A mirror device for a vehicle of a ninth aspect of the present invention is the mirror device for a vehicle of any one of the first to the eighth aspects further including: rotation gears that are rotated by driving of the motors so as to adjust the mirror-face angle of the mirror; and support walls provided so as to surround outside peripheries of the rotation gears to rotatably support the rotation gears.

In the mirror device for a vehicle of the first aspect of the present invention, the mirror-face angle of the mirror is adjusted by driving the motors. The pair of housing member fit together, and the pair of motors are internally housed in the pair of housing members. The outer peripheral wall is provided to the fitting portion of the pair of housing members, and the outer peripheral wall surrounds the outside periphery of the pair of motors.

The outer peripheral face of the outer peripheral wall slopes continuously downwards on progression along the peripheral direction from the uppermost portion of the outer peripheral face towards the end edges of the outer peripheral face in plan view. Accordingly the outer peripheral wall can always make a liquid from the upper side flow downwards towards the lower side of the outer peripheral wall, and the liquid can be suppressed from remaining standing on the outer peripheral wall.

In the mirror device for a vehicle of the second aspect of the present invention, the outer peripheral wall is placed in the right hand side mounting orientation when the mirror is employed for the vehicle right hand side and the outer peripheral wall is placed in the left hand side mounting orientation when the mirror is employed for the vehicle left hand side.

In this aspect, the outer peripheral face of the outer peripheral wall slopes continuously downwards on progression along the peripheral direction from the uppermost portion of the outer peripheral face towards the end edges of the outer peripheral face in plan view in both cases where the outer peripheral wall is placed in the right hand side mounting orientation and where placed in the left hand side mounting orientation. Liquid from the upper side of the outer peripheral wall can accordingly be suppressed from remaining standing on the outer peripheral wall in cases where the mirror is employed on the vehicle right hand side and where the mirror is employed on the vehicle left hand side.

In the mirror device for a vehicle of the third aspect of the present invention, the upper covering portion of the outer peripheral wall covers an upper side of one of the motors that is disposed on an upper location; and the lower covering portion of the outer peripheral wall covers an upper side of the other of the motors that is disposed on a lower location, the lower covering portion is communicated to the lower portion of the upper covering portion.

In this aspect, downwards angle of slope of the outer peripheral face is greater at the lower covering portion than at the upper covering portion. Therefore, liquid from the upper side of the portion of the outer peripheral wall from the upper covering portion to the lower covering portion can accordingly be made to flow efficiently downwards, and the liquid can be efficiently suppressed from standing and remaining on the outer peripheral wall.

In the mirror device for a vehicle of the fourth aspect of the present invention, the outer peripheral wall is placed in the right hand side mounting orientation when the mirror is employed for the vehicle right hand side and the outer peripheral wall is placed in the left hand side mounting orientation when the mirror is employed for the vehicle left hand side.

In this aspect the downwards angle of slope of the outer peripheral face is greater at the lower covering portion than at the upper covering portion in cases when the outer peripheral wall is placed in the right hand side mounting orientation and when placed in the left hand side mounting orientation. Liquid from the upper side of the outer peripheral wall can accordingly be efficiently suppressed from remaining standing on the outer peripheral wall in cases when the mirror is employed in the vehicle right hand side and when the mirror is employed on the left hand side.

The mirror device for a vehicle of the fifth aspect of the present invention is provided with the rotation gears at the upper side of the outer peripheral wall, adjusting the mirror-face angle of the mirror by driving of the motors rotating the rotation gears.

In this aspect, the restriction wall is provided at the upper side of the rotation gears, and the restriction wall restricts liquid from flowing downwards onto the rotation gears and the outer peripheral wall. Liquid can accordingly be suppressed from reaching the rotation gears. Furthermore, liquid from the upper side can be suppressed from reaching the outer peripheral wall and liquid can be better suppressed from remaining standing on the outer peripheral wall.

In the mirror device for a vehicle of the sixth aspect of the present invention, the gap is provided between the outer peripheral wall and the restriction wall, the liquid passes through the gap. Liquid can accordingly be made to flow downwards through the gap, and liquid can be better suppressed from remaining standing on the outer peripheral wall.

In the mirror device for a vehicle of the seventh aspect, the mirror-face angle of the mirror is adjusted by driving of the motors rotating the rotation gears. The stopper portion stops movement of the rotation gear.

The peripheral face of the stopper portion also slopes continuously downwards on progression along the peripheral direction from the uppermost portion of the stopper portion towards the end edge of the stopper portion in plan view. The stopper portion can accordingly always make liquid from the upper side flow downwards towards the lower side of the stopper portion, and liquid can be suppressed from remaining standing on the stopper portion.

In the mirror device for a vehicle of the eighth aspect of the present invention, the stopper portion is placed in the right hand side mounting orientation when the mirror is employed for the vehicle right hand side, and the stopper portion is placed in the left hand side mounting orientation when the mirror is employed for the vehicle left hand side In this aspect, the peripheral face of the stopper portion slopes continuously downwards on progression along the peripheral direction from the uppermost portion of the stopper portion towards the end edge of the stopper portion in plan view in cases when the stopper portion is placed in the right hand side mounting orientation and when placed in the left hand side mounting orientation. Liquid from the upper side of the stopper portion can accordingly be suppressed from remaining standing on the stopper portion in cases when the mirror is employed for the vehicle right hand side and when the mirror is employed for the vehicle left hand side.

In the mirror device for a vehicle of the ninth aspect of the present invention, the mirror-face angle of the mirror is adjusted by driving of the motors rotating the rotation gears. The support walls rotatably support the rotation gears.

In this aspect the support walls surround the outside peripheries of the rotation gears. Accordingly a lubrication agent for the rotation gears can be retained inside the support walls.

BRIEF DESCRIPTION OF THE DRAWINGS

Exemplary embodiments of the present invention will be described in detail based on the following figures, wherein.

DETAILED DESCRIPTION OF THE INVENTION

Figure 3:
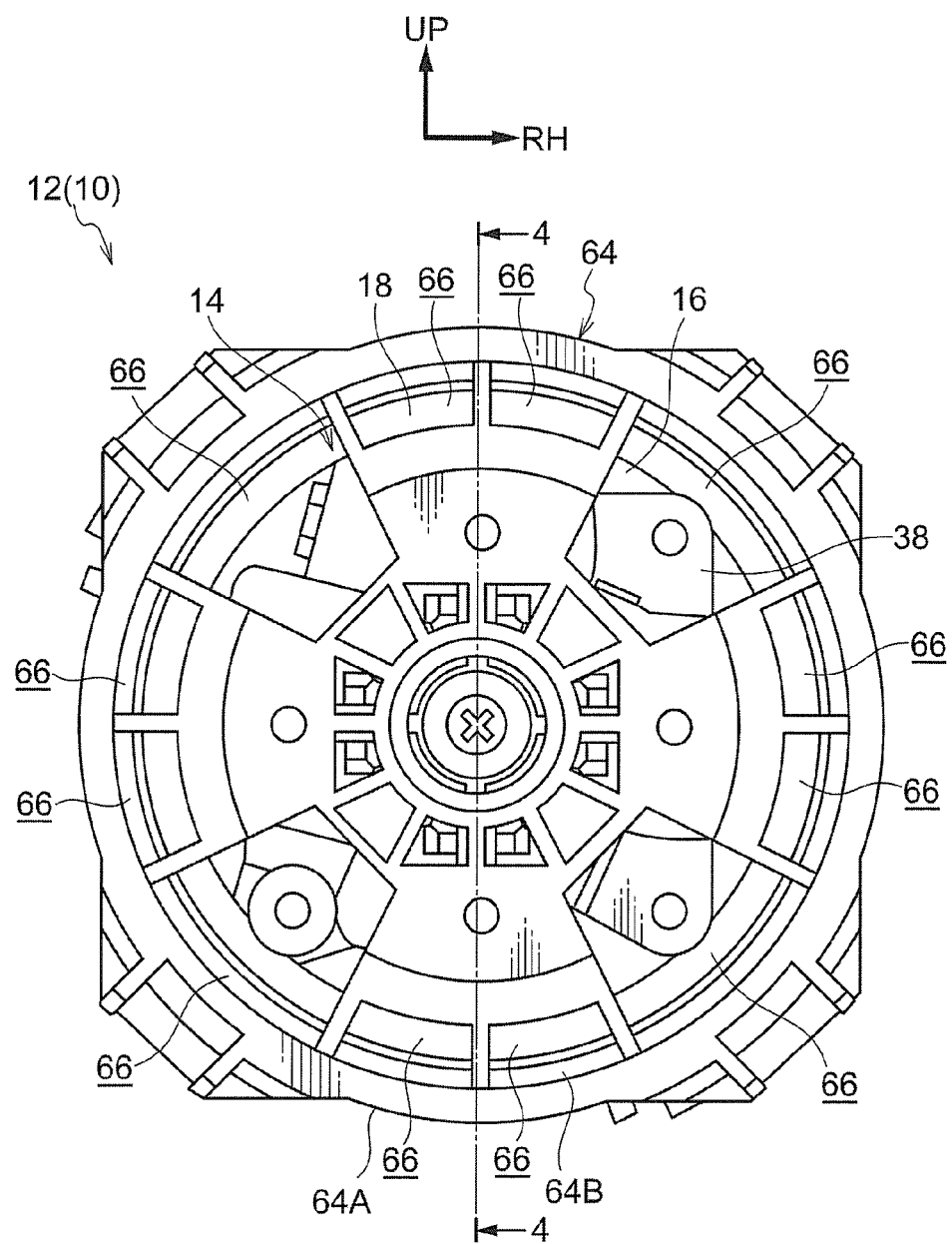
FIG. 3 is a face-on view illustrating a mirror-face adjustment device in a vehicle right hand side vehicle door mirror apparatus of an exemplary embodiment of the present invention, viewed from the vehicle rear direction.
Figure 4:
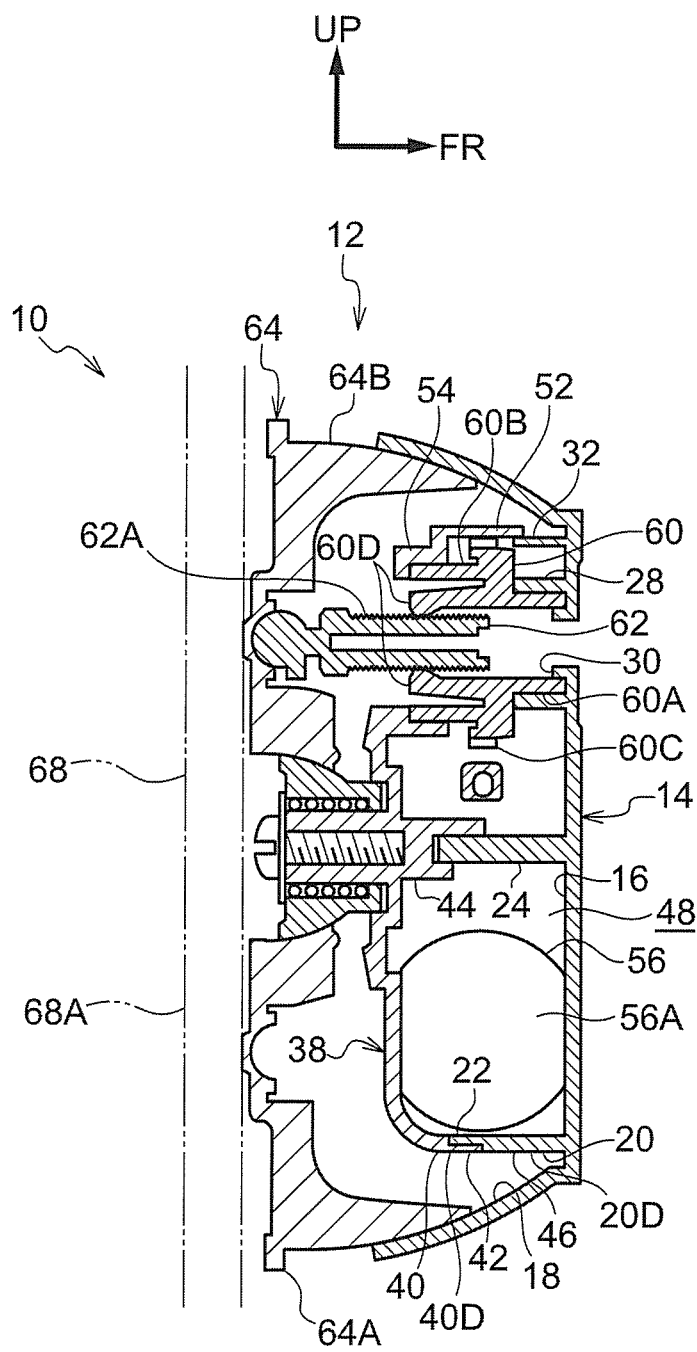
FIG. 4 is a cross-section (taken on line 4-4 of FIG. 3) illustrating a mirror-face adjustment device of a vehicle right hand side vehicle door mirror apparatus according to an exemplary embodiment of the present invention, viewed from a vehicle width direction outside.

FIG. 3 is a face-on view illustrating main portions of a vehicle right hand side vehicle door mirror device 10 according to an exemplary embodiment of the present invention applied to a vehicle mirror device, viewed from the vehicle rear direction. FIG. 4 is a cross-section of main portions of the vehicle door mirror device 10 (a cross-section taken on line 4-4 of FIG. 3), as viewed from the vehicle right hand side (vehicle width direction outside). In the drawings arrow FR indicates the vehicle front direction, arrow RH indicates the vehicle right direction, and arrow UP indicates the upward direction.

The vehicle door mirror device 10 according to the present exemplary embodiment is mounted to a right side vehicle door, with a mirror surface adjustment device 12 (mirror surface angle adjustment device) serving as an adjusting section illustrated in FIG. 3 and FIG. 4 internally provided to the vehicle door mirror device 10.

Figure 1:
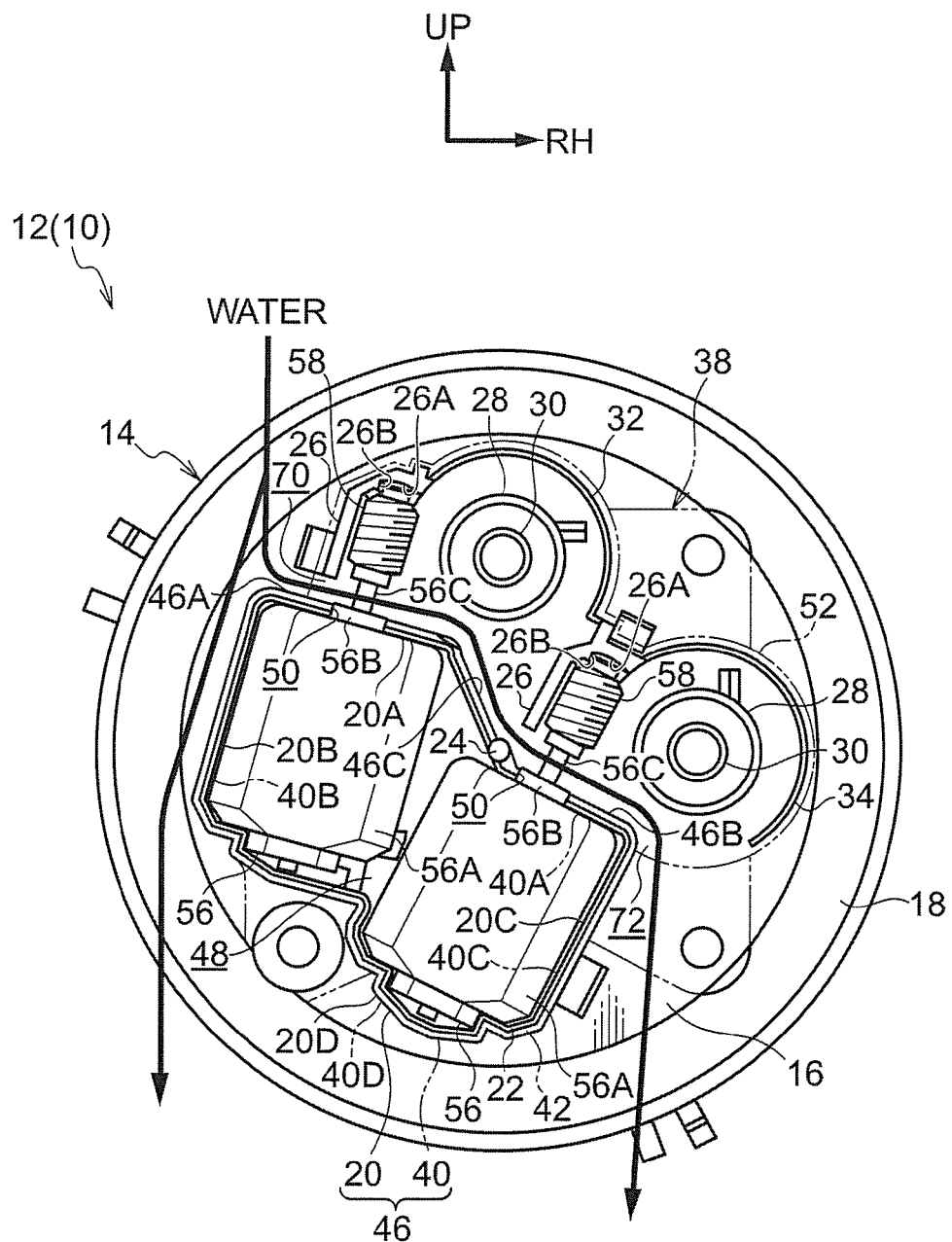
FIG. 1 is a face-on view illustrating a case and motors of a mirror-face adjustment device in a vehicle right hand side vehicle door mirror apparatus of an exemplary embodiment of the present invention, viewed from the vehicle rear direction.
Figure 2:
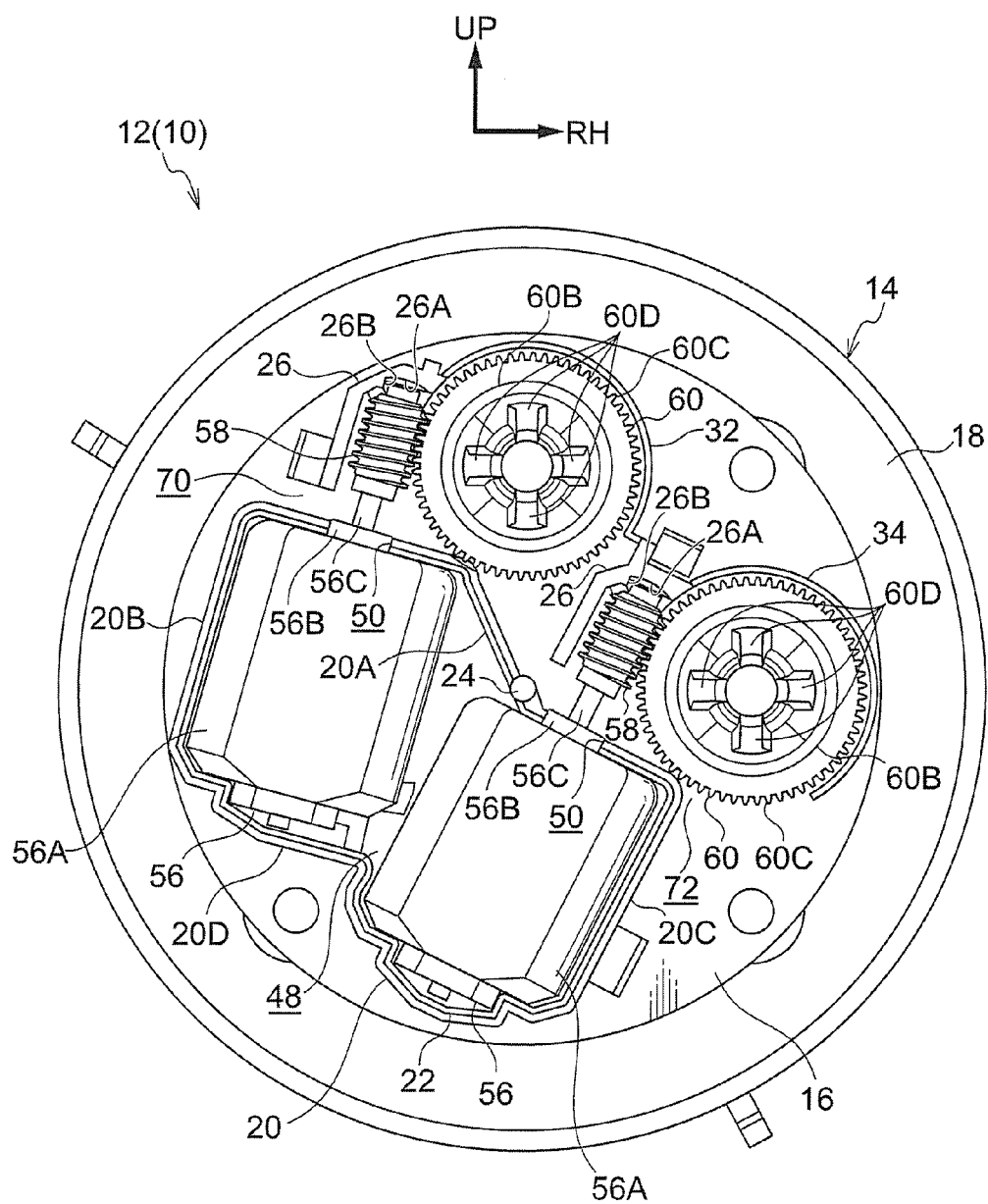
FIG. 2 is a face-on view illustrating a case, motors, worm gears and wheel drives of a mirror-face adjustment device in a vehicle right hand side vehicle door mirror apparatus of an exemplary embodiment of the present invention, viewed from the vehicle rear direction.

As shown in FIG. 1 and FIG. 2, the mirror surface adjustment device 12 is provided with a case 14 (a case upper) that serves as a housing member (a mounting member) and is formed from resin in a substantially semi-spherical container shape. The case 14 is fixed at the inside of the vehicle door mirror device 10. The vehicle rear side face of the case 14 is open, and a vehicle front side face on the inner peripheral side of the case 14 configures a circular flat plane shaped bottom face 16 disposed perpendicular to the vehicle front-rear direction. The vehicle rear side face at the inner peripheral side of the case 14 configures a ring shaped turning face 18. The turning face 18 curves round in a spherical face shape centered on a turn center of a mirror holder 64, described below, and disposed coaxially to the bottom face 16.

A frame profile plate shaped housing wall 20 is integrally formed at a lower side portion of the bottom face 16 of the case 14. The housing wall 20 projects out from the bottom face 16 towards the vehicle rear side. A frame profile plate shaped fitting wall 22 configuring a fitting section is integrally formed to a vehicle rear side end of the housing wall 20 on an inner peripheral side portion thereof. The fitting wall 22 is configured with a thickness that is thinner than other portions of the housing wall 20.

The upper side portion, left hand side portion, right hand side portion and lower side portion of the housing wall 20 respectively configure a plate shaped first wall 20A, second wall 20B, third wall 20C, and fourth wall 20D. The first wall 20A bends at a specific number of locations (two locations in the present exemplary embodiment) at length direction intermediate portions of the first wall 20A, and the first wall 20A slopes downwards on progression towards the vehicle right hand side. The second wall 20B and the third wall 20C slope downwards on progression towards the vehicle left hand side. The fourth wall 20D bends at plural locations at length direction intermediate portions of the fourth wall 20D.

A circular pillar shaped fitting pillar 24 configuring a fitting section is integrally formed at a length direction intermediate portion of the first wall 20A, and the fitting pillar 24 is integrated to the bottom face 16. The fitting pillar 24 is disposed coaxially to the bottom face 16, and projects out further towards the vehicle rear-side with respect to the first wall 20A (including the fitting wall 22).

A pair of substantially L-profile cross-section plate shaped shaft receiving walls 26, serving as stopper portions (shaft receiving portions) configuring a restriction wall, are integrally formed to upper side portion of the bottom face 16 of the case 14, with the shaft receiving walls 26 projecting out from the bottom face 16 towards the vehicle rear side. The inside face of each of the shaft receiving walls 26 configures an axial direction shaft receiving face 26A, serving as an axial direction stopper face. The shaft receiving faces 26A are formed so as to curve around in an indented (concave) shape. A radial direction shaft receiving face 26B serving as a radial direction stopper face is formed on the inside face of each of the shaft receiving walls 26. The radial direction shaft receiving faces 26B are formed with a flat-plane shape.

The peripheral face (outer peripheral face) of one of the shaft receiving walls 26 (on the vehicle left hand side) slopes continuously (always) downwards on progression from the uppermost portion towards the vehicle left hand side edge of the shaft receiving wall 26.

A circular cylindrical shaped first support cylinder 28 configuring a support wall is integrally formed to the bottom face 16 of the case 14 at the side of each of the shaft receiving walls 26. The first support cylinders 28 project out from the bottom face 16 towards the vehicle rear side. A circular cylindrical shaped second support cylinder 30 serving as a retaining wall is integrally formed to the bottom face 16 of the case 14 at the inside of each of the first support cylinders 28. The second support cylinders 30 project out from the bottom face 16 towards the vehicle rear-side and are disposed coaxially to the first support cylinders 28.

Substantially semi-circular cylindrical shaped connection walls 32, 34 configuring blocking walls are integrally formed to the bottom face 16 of the case 14 above each of the first support cylinders 28. The connection walls 32, 34 project out from the bottom face 16 towards the vehicle rear side and are disposed coaxially to each of the respective first support cylinders 28. One connection wall 32 connects one of the shaft receiving walls 26 to the other of the shaft receiving walls 26, and the other connection wall 34 is connected to the other shaft receiving wall 26.

As shown in FIG. 1, FIG. 3 and FIG. 4, a substantially container shaped case inner 38 (a case-lower) made from resin and serving as a housing member (a covering member) is fixed to the bottom face 16 of the case 14.

A frame profile plate shaped housing frame 40 is integrally formed to a lower side portion of the case inner 38. The housing frame 40 projects out from the case inner 38 towards the vehicle front side. A frame profile plate shaped fitting frame 42 configuring a fitting section is integrally formed at the vehicle front side end of the housing frame 40, on an outside peripheral portion thereof. The fitting frame 42 is configured thinner than other portions of the housing frame 40.

The upper side portion, left hand side portion, right hand side portion and lower side portion of the housing frame 40 configure respectively a plate shaped first frame 40A, second frame 40B, third frame 40C and fourth frame 40D. Similarly to the first wall 20A of the housing wall 20 of the case 14, the first frame 40A bends at a specific number of locations (two locations in the present exemplary embodiment) at length direction intermediate portions of the first frame 40A and slopes downwards on progression towards the vehicle rearside. Similarly to the second wall 20B and the third wall 20C of the housing wall 20, respectively, the second frame 40B and the third frame 40C slope downwards on progression towards the vehicle left hand side. Similarly to the fourth wall 20D of the housing wall 20, the fourth frame 40D bends at plural locations at length direction intermediate portions of the fourth frame 40D.

A circular cylindrical shaped fitting cylinder 44 configuring a fitting section is integrally formed at a length direction intermediate portion of the first frame 40A, so as to align with (correspond to) the fitting pillar 24 of the housing wall 20. The fitting cylinder 44 is integrated to the case inner 38, and is disposed coaxially to the fitting pillar 24.

The housing frame 40 is fitted together (overlapped) with the housing wall 20 of the case 14 in a state in which the fitting frame 42 is fitted over (overlapped with) the fitting wall 22 of the case 14 and the fitting pillar 24 of the case 14 is fitted (overlapped) on the inside of the fitting cylinder 44. In this state, the first frame 40A, the second frame 40B, the third frame 40C and the fourth frame 40D are fitted together with the first wall 20A, the second wall 20B, the third wall 20C and the fourth wall 20D, respectively, of the fitting wall 22.

The housing wall 20 together with the housing frame 40 configure an outer peripheral wall 46, and the upper side outer peripheral wall of the outer peripheral wall 46 (the upper side outer peripheral face in a range from the vehicle left hand side edge to the vehicle right hand side edge of the outer peripheral wall 46) is configured by the first wall 20A, the second wall 20B and the fitting pillar 24 together with the first frame 40A, the second frame 40B and the fitting cylinder 44. The upper side outer peripheral face of the outer peripheral wall 46 slopes continuously (always) downwards on progression from the uppermost portion towards the vehicle right hand side edge of the outer peripheral wall 46, and slopes continuously (always) downwards on progression from the uppermost portion towards the vehicle left hand side edge of the outer peripheral wall 46.

A housing space 48 is configured (formed) inside the outer peripheral wall 46 between the case inner 38 and the bottom face 16 of the case 14, with the whole of the outer periphery of the housing space 48 surrounded by the outer peripheral wall 46. A substantially plate shaped first covering portion 46A and second covering portion 46B are provided at upper side portions of the outer peripheral wall 46. The first covering portion 46A functions as an upper covering portion and is disposed at the upper side, and the second covering portion 46B functions as a lower covering portion and is disposed at the lower side. A substantially plate shaped intermediate covering portion 46C serving as a connection covering portion is provided to the upper side portion of the outer peripheral wall 46 between the first covering portion 46A and the second covering portion 46B. The intermediate covering portion 46C is disposed between the first covering portion 46A and the second covering portion 46B, and connects the first covering portion 46A and the second covering portion 46B together. The outer peripheral faces (the upper side outer peripheral faces) of the first covering portion 46A, the second covering portion 46B and the intermediate covering portion 46C have angles (with respect to the horizontal plane) of slope downwards on progression towards the vehicle right hand side that are greater in this order (that is, the angle of the intermediate covering portion 46C is the largest and the angle of the first covering portion 46A is the smallest).

Circular shaped fitting holes 50 are formed so as to pierce respectively through the first covering portion 46A and the second covering portion 46B of the outer peripheral wall 46. The fitting holes 50 are disposed so as to span between the first frame 40A and the first wall 20A. Gaps with a minimum dimension that is a specific dimension (for example, 1 mm) or greater are provided between all projecting portions on the bottom face 16 of the case 14 (such as the turning face 18, the shaft receiving walls 26 and the other connection wall 34) and the upper side outer peripheral face of the outer peripheral wall 46. More specifically, a gap 70 is provided between the one shaft receiving wall 26 and the outer peripheral wall 46, and a gap 72 is provided between the other connection wall 34 and the outer peripheral wall 46.

A plate shaped covering wall 52 configuring a restriction wall is integrally formed at a upper side portion of the case inner 38. The covering wall 52 projects out from the case inner 38 towards the vehicle front side. The covering wall 52 fits together with the pair of the shaft receiving walls 26 and the connection walls 32, 34 of the case 14, and both length direction ends of the covering wall 52 are connected to the housing frame 40.

At least a portion of the covering wall 52 is separated from the bottom face 16 of the case 14. A one length direction end of the covering wall 52 (the end portion on the one shaft receiving wall 26 side) is separated from the bottom face 16 of the case 14. The gap 70 is open (exists) with a minimum dimension that is a specific dimension (for example, 1 mm) or greater at a position where the one length direction end of the covering wall 52 faces the outer peripheral face of the outer peripheral wall 46. The other length direction end of the covering wall 52 (an end portion on the other connection wall 34 side) is separated from the bottom face 16 of the case 14. The gap 72 is open (exists) with a minimum dimension that is a specific dimension (for example, 1 mm) or greater at a position where the other length direction end of the covering wall 52 faces the outer peripheral face of the outer peripheral wall 46.

A pair of circular cylindrical shaped third support cylinders 54 configuring a restriction wall are integrally formed to upper side portions of the case inner 38 inside the covering wall 52. The third support cylinders 54 project out from the case inner 38 to the vehicle front side, and are disposed coaxially to the first support cylinders 28 of the case 14.

As shown in FIG. 1, FIG. 3 and FIG. 4, a pair of motors 56 serving as drive sections are housed between the case 14 and the case inner 38. A motor body 56A is provided to each of the motors 56. The pair of the motor bodies 56A are housed inside the housing space 48 and the whole of the outer periphery is surrounded by the outer peripheral wall 46. The pair of motor bodies 56A are positioned by the case 14, the case inner 38 and the outer peripheral wall 46, and are fixed inside the housing space 48.

A circular ring plate shaped shaft bearing 56B serving as a closure section is fixed to the motor body 56A. The face on the shaft bearing 56B side (the upper side face) of the motor body 56A of one of the motors 56 (on the upper side) is covered by the first covering portion 46A of the outer peripheral wall 46. The face on the shaft bearing 56B side (the upper side face) of the motor body 56A of the other of the motors 56 (on the lower side) is covered by the second covering portion 46B of the outer peripheral wall 46. The shaft bearings 56B fit into the fitting holes 50 of the outer peripheral wall 46, closing off the fitting holes 50. The outside end faces of the shaft bearings 56B (the end faces on the opposite side to the motor bodies 56A) are disposed flush with (in the same plane as) the upper side outer peripheral face of the outer peripheral wall 46. An output shaft 56C of each of the motors 56 passes from the motor body 56A through inside the shaft bearing 56B to extend outside the housing space 48. Each of the output shafts 56C fits inside and is supported by the respective shaft bearing 56B.

A worm gear 58 made from resin and serving as a rotation gear (an output gear) is provided to the output shaft 56C of each of the motors 56. The worm gear 58 is capable of rotating integrally with the output shaft 56C. Accordingly, each of the worm gears 58 is rotated as one with the output shaft 56C by the motor 56 being driven so as to rotate the output shaft 56C.

The worm gear 58 is disposed at the inside of the shaft receiving wall 26, and a leading end portion of each of the worm gears 58 (a portion on the opposite side to the output shaft 56C) faces the respective axial direction shaft receiving face 26A of the shaft receiving wall 26 along the axial direction, and faces the respective radial direction shaft receiving face 26B of the shaft receiving wall 26 along the radial direction. Consequently, particularly, as described later, when rotation of the worm gear 58 is restricted in a state in which the motor 56 is driven, movement (sliding) of the worm gear 58 along the axial direction is stopped by the axial direction shaft receiving face 26A, and movement (tilting) of the worm gear 58 in the radial direction is stopped by the radial direction shaft receiving face 26B.

A pair of substantially circular cylindrical shaped wheel drives 60 made from resin and serving as rotation gears (driving gears) are provided between the bottom face 16 of the case 14 and the case inner 38. A circular cylindrical shaped first rotation cylinder 60A is formed at a portion on the vehicle front side of each of the wheel drives 60. A circular cylindrical shaped second rotation cylinder 60B is formed at a portion on the vehicle rear side of each of the wheel drives 60. The first rotation cylinder 60A and the second rotation cylinder 60B are disposed coaxially to each other. The first rotation cylinder 60A and the second rotation cylinder 60B fit respectively between the first support cylinder 28 and the second support cylinder 30 of the case 14 and inside the third support cylinder 54 of the case inner 38. The wheel drives 60 are rotatably supported by the first support cylinder 28, the second support cylinder 30 and the third support cylinder 54. The first rotation cylinder 60A and the second rotation cylinder 60B make contact respectively with the bottom face 16 of the case 14 and the case inner 38, thereby stopping movement (sliding) of the wheel drives 60 in the axial direction.

One of the wheel drives 60 is disposed coaxially at the inner peripheral side of the connection wall 32 of the case 14 and at the inside of the covering wall 52 of the case inner 38. The other of the wheel drives 60 is disposed coaxially at the inner peripheral side of the connection wall 34 of the case 14 and at the inside of the covering wall 52 of the case inner 38. The outer periphery of the one of the wheel drives 60 is disposed along the connection wall 32 and the covering wall 52, and the outer periphery of the other of the wheel drives 60 is disposed along the connection wall 34 and the covering wall 52.

A worm wheel 60C serving is an engagement portion is formed coaxially to the wheel drive 60 at an intermediate portion in the vehicle front-rear direction. Each of the worm wheels 60C is meshed (engaged) with the respective worm gear 58. Accordingly, the worm wheel 60C is rotated by driving the motor 56 and rotating the worm gear 58, thereby rotating the wheel drive 60.

A specific number (four in the present exemplary embodiment) of meshing claws 60D are integrally formed to each of the wheel drives 60 at the inner peripheral side of the second rotation cylinder 60B. The specific number of meshing claws 60D are disposed at even intervals around the circumferential direction of the wheel drive 60. The meshing claws 60D are resilient. The leading ends (the vehicle rear side ends) of the meshing claws 60D project out to the radial direction inside of the wheel drive 60.

As shown in FIG. 4, a substantially circular shaft shaped rod drive 62 serving as a drive member is inserted inside each of the wheel drives 60 and rotation of the rod drive 62 about a center axis is restricted.

One of the wheel drives 60 is disposed above the fitting pillar 24 of the case 14 and the other of the wheel drives 60 is disposed to the vehicle right hand side of the fitting pillar 24 (to the outside in the vehicle width direction).

A portion of the rod drive 62 other than the leading end portion (the vehicle rear side end portion) configure a screw 62A, and the leading ends of the meshing claws 60D of the wheel drive 60 mesh (engage) with the screw 62A. Accordingly, as described above, by driving the motor 56 to rotate the wheel drive 60 (including the meshing claws 60D), the meshing position with the screw 62A of the leading ends of the meshing claws 60D is displaced, and the rod drive 62 is moved (slid) in the vehicle front-rear direction.

As shown in FIG. 3 and FIG. 4, a mirror holder 64 serving as a retaining (holding) member is provided at the vehicle rear side of the case 14. A substantially circular plate shaped holder portion 64A is formed at a portion on the vehicle rear side end of the mirror holder 64. The center of the holder portion 64A is retained (held) by the case inner 38 so as to be capable of turning, and accordingly the mirror holder 64 is retained by the case inner 38 so as to be capable of turning.

The holder portion 64A is retained (held) by a leading end portion (a portion at the vehicle rear side end) of the rod drive 62 so as to be capable of turning. By driving the motors 56 as described above, the rod drives 62 are moved in the vehicle front-rear direction, thereby driving and turning the mirror holder 64. Turning of the mirror holder 64 is stopped when the outer peripheral edge of the holder portion 64A makes contact with the vehicle rear side end face of the case 14, thereby restricting rotation of the wheel drive 60 and restricting rotation of the worm gear 58.

A substantially semi-spherical wall shaped turn wall 64B is integrally formed to the vehicle front side face of the holder portion 64A. The vehicle front side face of the turn wall 64B is open. The turn wall 64B curves around in a spherical shape centered on the turn center of the mirror holder 64. The turn wall 64B makes contact with (is pressed by) the turning face 18 of the case 14. Accordingly, the turn wall 64B is slid on the turning face 18 by turning the mirror holder 64.

Opening holes 66 of a predetermined number are formed in the holder portion 64A so as to pass through at the inner peripheral side of the turn wall 64B. The opening holes 66 of the predetermined number open the inside of the mirror surface adjustment device 12 (the inside of the case 14) towards the vehicle rear side.

A mirror 68 is retained at the vehicle rear-side of the holder portion 64A. The mirror 68 is capable of turning (tilting) as one with the mirror holder 64. The vehicle rear-side face of the mirror 68 configures a mirror (finished) face 68A, and an occupant of the vehicle is able to see towards the vehicle rear-side using the mirror 68.

The entire periphery of the worm gears 58, the wheel drives 60 and the rod drives 62, the case inner 38 (including inside the covering wall 52 and inside the third support cylinder 54), the mirror holder 64, and the case 14 (including inside the shaft receiving walls 26, the inner peripheral side of the connection walls 32, 34 and between the first support cylinder 28 and the second support cylinder 30) peripheral of the worm gears 58, the wheel drives 60 and the rod drives 62 are coated in a grease (not shown in the drawings) serving as a lubrication agent. Rotation of the worm gears 58 and the wheel drives 60 and movement of the rod drives 62 are thereby performed smoothly.

Figure 6:
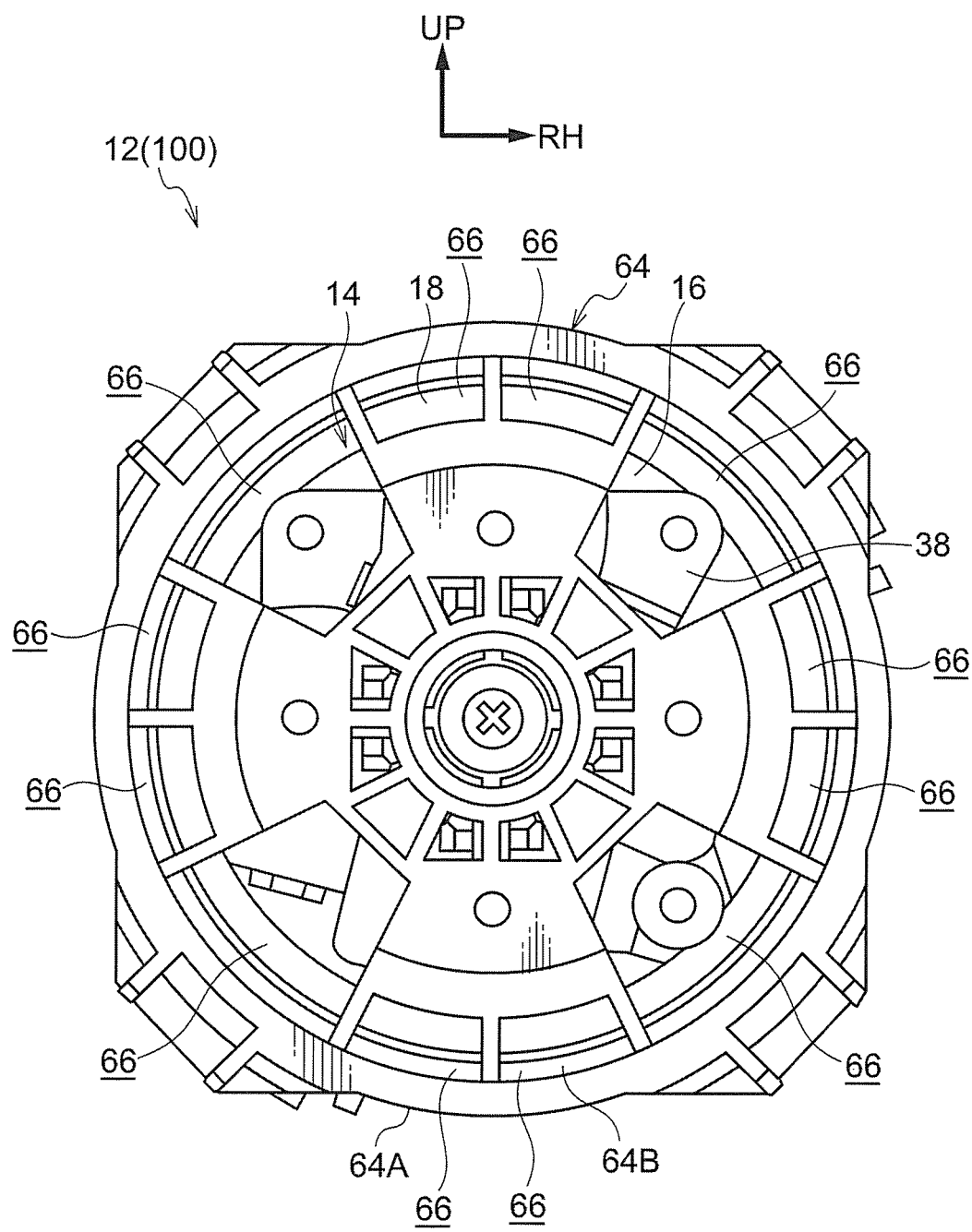
FIG. 6 is a face-on view illustrating a mirror-face adjustment device in a vehicle left hand side vehicle door mirror apparatus of an exemplary embodiment of the present invention, viewed from the vehicle rear direction.

FIG. 6 illustrates a face-on view of main portions of a left side vehicle door mirror device 100 according to an exemplary embodiment of the present invention applied to a mirror device for a vehicle, as viewed from the vehicle rear direction.

The left side vehicle door mirror device 100 according to the present exemplary embodiment is disposed on a vehicle left side door, and configured substantially symmetrical to the vehicle right side vehicle door mirror device 10 about a perpendicular plane perpendicular to the vehicle width direction at the vehicle width direction center of the vehicle.

Figure 5:
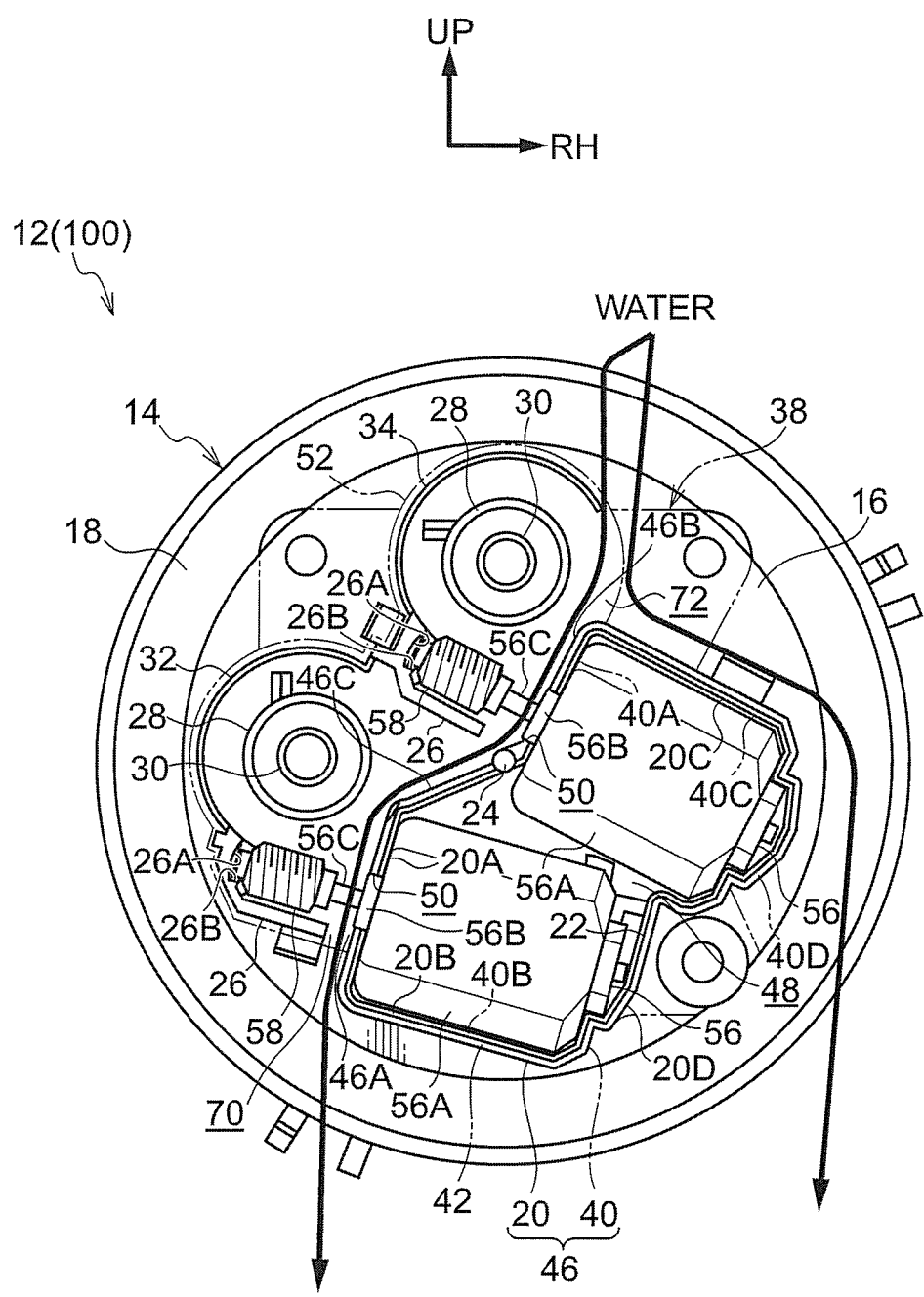
FIG. 5 is a face-on view illustrating a case and motors of a mirror-face adjustment device in a vehicle left hand side vehicle door mirror apparatus of an exemplary embodiment of the present invention, viewed from the vehicle rear direction.

As shown in FIG. 5 and FIG. 6, a mirror-face adjustment device 12 which is the same as that of the vehicle door mirror device 10 is provided to the vehicle door mirror device 100. In the vehicle door mirror device 100, the mirror-face adjustment device 12 same as that of the vehicle right side vehicle door mirror device 10 is mounted in a state with the upper portion rotated by 90° towards the vehicle left side.

In the housing wall 20 of the case 14, the first wall 20A slopes downwards on progression towards the vehicle left hand side, and the second wall 20B and the third wall 20C slope downwards on progression towards the vehicle right hand side.

In the housing frame 40 of the case inner 38, the first frame 40A slopes downwards on progression towards the vehicle left hand side, and the second frame 40B and the third frame 40C slope downwards on progression towards the vehicle right hand side.

The upper side outer peripheral face of the outer peripheral wall 46 (the upper side outer peripheral face in a range from the edge on the vehicle left hand side to the edge on the vehicle right hand side of the outer peripheral wall 46) is configured by the first wall 20A, the third wall 20C, the upper portion of the fourth wall 20D and the fitting pillar 24, and by the first frame 40A, the third frame 40C, the upper portion of the fourth frame 40D and the fitting cylinder 44. The upper side outer peripheral face of the outer peripheral wall 46 slopes continuously downwards on progression from the uppermost portion of the outer peripheral wall 46 to the vehicle right hand side edge of the outer peripheral wall 46, and continuously slopes downwards from the uppermost portion of the outer peripheral wall 46 towards the left hand side edge of the outer peripheral wall 46.

The first covering portion 46A of the outer peripheral wall 46 functions as a lower covering portion disposed at a lower side, and the second covering portion 46B functions as an upper covering portion disposed at an upper side. The outer peripheral face (the upper side outer peripheral face) of the first covering portion 46A, the second covering portion 46B and the intermediate covering portion 46C have angles (with respect to the horizontal plane) of slope downwards on progression towards the vehicle left hand side, with the angle of slopes smaller in this order (that is, the angle of the intermediate covering portion 46C is the smallest and the angle of the first covering portion 46A is the largest).

The face on the shaft bearing 56B side (the upper side face) of the motor body 56A of one of the motors 56 (on the upper side) is covered by the first covering portion 46A of the outer peripheral wall 46.

The face on the shaft bearing 56B side (the upper side face) of the motor body 56A of one of the motors 56 (on the lower side) is covered by the first covering portion 46A of the outer peripheral wall 46, and the face on the shaft bearing 56B side (the upper side face) of the motor body 56A of the other of the motors 56 (on the upper side) is covered by the second covering portion 46B of the outer peripheral wall 46.

The peripheral face (outer peripheral face) of one of shaft receiving walls 26 (on the vehicle left hand side) slopes continuously downwards on progression from the uppermost portion towards the vehicle left hand side edge of the shaft receiving wall 26.

One of the wheel drives 60 is disposed to the vehicle left hand side (the vehicle width direction outside) of the fitting pillar 24 of the case 14, and the other of the wheel drives 60 is disposed above the fitting pillar 24.

Explanation follows regarding operation of the present exemplary embodiment.

For the vehicle door mirror device 10, 100 configured as described above, in the mirror surface adjustment device 12 the worm gears 58 are rotated by driving the motors 56 so as to rotate the output shafts 56C, thereby rotating the respective wheel drive 60 (including the worm wheel 60C and the specific number of the meshing claws 60D) and moving the respective rod drive 62 in the vehicle front-rear direction. The mirror holder 64 (including the holder portion 64A) and the mirror 68 are accordingly turned by the rod drive(s) 62 in at least one of the up-down direction and/or the vehicle width direction, thereby adjusting the angle of the mirror surface 68A of the mirror 68 in at least one of the up-down direction and/or the vehicle width direction.

Movement of each of the worm gears 58 along the axial direction is stoppable by the axial direction shaft bearing face 26A of the shaft receiving wall 26, and movement of each of the worm gears 58 in the radial direction is stoppable by the radial direction shaft bearing face 26B of the shaft receiving wall 26.

The motor bodies 56A of the pair of motors 56 are housed in the housing space 48 between the case 14 and the case inner 38, and whole of the outer periphery is surrounded by the outer peripheral wall 46 (the housing wall 20 of the case 14 and the housing frame 40 of the case inner 38) of the housing space 48. The pair of fitting holes 50 in the outer peripheral wall 46 are closed off by insertion of the respective shaft bearings 56B of the pair of motor bodies 56A in the fitting holes 50.

The upper side outer peripheral face of the outer peripheral wall 46 (including the outside end faces of the shaft bearings 56B) slopes continuously downwards on progression from the uppermost portion towards the vehicle right hand side edge of the outer peripheral wall 46, and slopes continuously downwards on progression from the uppermost portion towards the vehicle left hand side edge of the outer peripheral wall 46.

Accordingly, even supposing water (liquid) is to penetrated from outside the mirror-face adjustment device 12 to inside the mirror-face adjustment device 12 though the opening hole(s) 66 in the mirror holder 64 (in the holder portion 64A)

and to reach the upper side of the upper side outer peripheral face of the outer peripheral wall 46, due to the upper side outer peripheral face of the outer peripheral wall 46, the water always flows towards the lower side of the outer peripheral wall 46, accordingly, it enables water to be suppressed or prevented from remaining standing on the upper side outer peripheral face of the outer peripheral wall 46. Accordingly water that might have remained standing on the upper side outer peripheral face of the outer peripheral wall 46 can be suppressed or prevented from penetrating (seeping through) to the motor bodies 56A inside the housing space 48 through between the housing wall 20 and the housing frame 40 (including between the fitting holes 50 and the shaft bearings 56B). Consequently, problems such as rust in the motor bodies 56A can be suppressed or prevented from occurring.

Furthermore, the downwards angle (with respect to the horizontal plane) of slope of the outer peripheral face (the upper side outer peripheral face) is greater for whichever of the second covering portion 46B or the first covering portion 46A of the outer peripheral wall 46 is covering the upper side face of the lower motor body 56A than the angle of slope for whichever of the first covering portion 46A or the second covering portion 46B of the outer peripheral wall 46 is covering the upper side face of the upper motor body 56A. (For example, in the vehicle door mirror device 10 shown in FIG. 1, the downwards angle (with respect to the horizontal plane) of slope of the outer peripheral face (the upper side outer peripheral face) is greater for the second covering portion 46B of the outer peripheral wall 46 covering the upper side face of the lower motor body 56A than the angle of slope for the first covering portion 46A of the outer peripheral wall 46 covering the upper side face of the upper motor body 56A.) Consequently, water can be made to flow efficiently from the upper side downwards at the portion of the outer peripheral wall 46 from the first covering portion 46A to the second covering portion 46B. Accordingly water can be efficiently suppressed or prevented from remaining standing on the portion of the outer peripheral wall 46 from the first covering portion 46A to the second covering portion 46B.

Furthermore, gaps with a minimum dimension of a specific dimension (for example, 1 mm) or greater are provided between the upper side outer peripheral face of the outer peripheral wall 46 and all the projection portions on the bottom face 16 of the case 14 (such as the turning face 18, the shaft receiving walls 26 and the other connection wall 34). In addition, the covering wall 52 of the case inner 38 opens the gap 70 between the one shaft receiving wall 26 and the outer peripheral wall 46 with a minimum dimension of a specific dimension (for example, 1 mm) or greater, and the covering wall 52 of the case inner 38 opens the gap 72 between the other connection wall 34 and the outer peripheral wall 46 with a minimum dimension of a specific dimension (for example, 1 mm) or greater. The gaps (including the gap 70 and the gap 72) can hence let water flow downwards (pass through), and downwards flow of water due to the upper side outer peripheral face of the outer peripheral wall 46 can accordingly be suppressed or prevented from being impeded in the gaps (in particular impeded by water surface tension). Consequently, water can be even better suppressed or prevented from remaining standing on the upper side outer peripheral face of the outer peripheral wall 46.

The upper side of the upper side outer peripheral face of the outer peripheral wall 46 is also covered by the pair of shaft receiving walls 26, the connection walls 32, 34 of the case 14 and the covering wall 52 of the case inner 38. Accordingly water from above can be suppressed from reaching the upper side outer peripheral face of the outer peripheral wall 46, even further enabling water to be suppressed or prevented from remaining standing on the upper side outer peripheral face of the outer peripheral wall 46.

The worm gears 58 are disposed at the inside of the shaft receiving walls 26 of the case 14. The first support cylinders 28 of the case 14 also surround the entire outside periphery of the first rotation cylinders 60A of the respective wheel drives 60. Grease can hence be retained inside the shaft receiving walls 26 and in the first support cylinders 28 (between the first support cylinder 28 and the second support cylinder 30), enabling operation of the mirror-face adjustment device 12 (rotation of the worm gears 58 and the wheel drives 60) to be stabilized.

The peripheral face (outer peripheral face) formed at the shaft receiving wall 26 on the vehicle left hand side and a covering portion for this shaft receiving wall 26 in the covering wall 52 of the case inner 38 slopes continuously downwards from uppermost portion towards vehicle left hand side edge. Hence even water is to reach the vehicle left hand side of this peripheral face than the uppermost portion, due to this peripheral face, such water can be made to flow downwards towards the lower side of this peripheral face, and enabling water to be suppressed or prevented from remaining standing on this peripheral face. Water can accordingly be suppressed or prevented from penetrating inside the shaft receiving wall 26, and grease inside the shaft receiving wall 26 can be efficiently retained.

The worm gears 58 and the wheel drives 60 are also covered by the case 14 (including the housing wall 20, the pair of shaft receiving walls 26 and the connection walls 32, 34) and by the case inner 38 (including the housing frame 40 and the covering wall 52). Water can accordingly be suppressed or prevented from penetrating to the worm gears 58 and the wheel drives 60, enabling grease surrounding the worm gears 58 and the wheel drives 60 to be suppressed or prevented from being washed out. Also foreign objects such as dust can be suppressed or prevented from adhering to the worm gears 58 and the wheel drives 60. Operation of the mirror-face adjustment device 12 (rotation of the worm gears 58 and the wheel drives 60) can accordingly be even better stabilized.

Even though the rotation position of the mirror-face adjustment device 12 is different in the right hand side mount orientation (install-attitude) of the mirror-face adjustment device 12 (see FIG. 1 and FIG. 3) for the vehicle right hand side vehicle door mirror device 10 and the left hand side mount orientation (install-attitude) of the mirror-face adjustment device 12 (see FIG. 5 and FIG. 6) for the vehicle left hand side vehicle door mirror device 100, the same operation and effect as described above can be exhibited. Accordingly the mirror-face adjustment device 12 can be appropriately mounted to both the vehicle right hand side vehicle door mirror device 10 and the vehicle left hand side vehicle door mirror device 100.

In the present exemplary embodiments the present invention is applied to the configurations of the vehicle door mirror apparatuses 10, 100, however the present invention may also be applied to configurations of other external or internal mirror device for a vehicles.

What is claimed is:

1. A mirror device for a vehicle, comprising:
   a mirror;
   a pair of motors that adjust a mirror-face angle of the mirror by driving;
   a pair of housing members that fit together to internally house the pair of motors;
   an outer peripheral wall configured to include a fitting portion of the pair of housing members, that surrounds an outside periphery of the pair of motors, an outer peripheral face of the outer peripheral wall sloping continuously downwards along a peripheral direction from an uppermost portion thereof on progression towards end edges thereof in plan view in a state in which the minor device is installed on the vehicle, wherein the outer peripheral wall positions and fixes the pair of motors to the minor device, rotation gears that are rotated by driving of the motors so as to adjust the minor-face angle of the minor, and a stopper portion that stops movement of one of the rotation gears and has a peripheral face that slopes continuously downwards on progression along a peripheral direction from an uppermost portion of the stopper portion towards an end edge of the stopper portion in plan view.

2. The minor device for a vehicle of claim 1, wherein: the outer peripheral wall is placed in a right hand side mounting orientation in a case in which the minor is employed at a vehicle right hand side, and the outer peripheral wall is placed in a left hand side mounting orientation in a case in which the minor is employed at a vehicle left hand side; and the outer peripheral face of the outer peripheral wall slopes continuously downwards on progression along the peripheral direction from the uppermost portion towards the end edges in plan view in cases where the outer peripheral wall is placed in the right hand side mounting orientation and where the outer peripheral wall is placed in the left hand side mounting orientation.

3. The minor device for a vehicle of claim 1, wherein the outer peripheral wall comprises: an upper covering portion that covers an upper side of one of the motors that is disposed at an upper location; and a lower covering portion that covers an upper side of the other of the motors that is disposed at a lower location, the lower covering portion being communicated to a lower side of the upper covering portion, wherein downwards angle of slope of the outer peripheral face is greater at the lower covering portion than at the upper covering portion.

4. The mirror device for a vehicle of claim 3, wherein: the outer peripheral wall is placed in a right hand side mounting orientation in a case in which the minor is employed at a vehicle right hand side, and the outer peripheral wall is placed in a left hand side mounting orientation in a case in which the mirror is employed at a vehicle left hand side; and the downwards angle of slope of the outer peripheral face is greater at the lower covering portion than at the upper covering portion in the cases in which the outer peripheral wall is placed in the right hand side mounting orientation and where the outer peripheral wall is placed in the left hand side mounting orientation.

5. The mirror device for a vehicle of claim 3, further comprising: a restriction wall provided at an upper side of the rotation gears, that restricts downwards flow of a liquid onto the rotation gears and the outer peripheral wall.

6. The minor device for a vehicle of claim 5, wherein a gap through which the liquid passes is provided between the outer peripheral wall and the restriction wall.

7. The minor device for a vehicle of claim 3, further comprising: support walls provided so as to surround outside peripheries of the rotation gears to rotatably support the rotation gears.

8. The mirror device for a vehicle of claim 1, further comprising: a restriction wall provided at an upper side of the rotation gears, that restricts downwards flow of a liquid onto the rotation gears and the outer peripheral wall.

9. The minor device for a vehicle of claim 8, wherein a gap through which the liquid passes is provided between the outer peripheral wall and the restriction wall.

10. The mirror device for a vehicle of claim 1, wherein: the stopper portion is placed in a right hand side mounting orientation in a case in which the mirror is employed at a vehicle right hand side, and the stopper portion is placed in a left hand side mounting orientation in a case in which the mirror is employed at a vehicle left hand side; and the peripheral face of the stopper portion slopes continuously downwards on progression along the peripheral direction from the uppermost portion of the stopper portion towards the end edge of the stopper portion in plan view in the cases in which the stopper portion is placed in the right hand side mounting orientation and in which the stopper portion is placed in the left hand side mounting orientation.

11. The minor device for a vehicle of claim 1, further comprising: support walls provided so as to surround outside peripheries of the rotation gears to rotatably support the rotation gears.

12. The mirror device for a vehicle of claim 1, the pair of motors each further comprising: a motor main body; wherein
the rotation gears are provided at the motor main bodies, and are rotated by driving of the corresponding motor so as to adjust the minor-face angle of the mirror, and
wherein the outer peripheral wall positions and fixes the pair of motors to the mirror device by abutting the motor main bodies of the pair of motors.

13. The mirror device for a vehicle of claim 12, wherein the outer peripheral wall surrounds the whole of an outer periphery of a housing space for housing the motor main bodies of the pair of motors in the plan view.

14. The mirror device for a vehicle of claim 13, wherein each rotation gear is disposed at an outer side of the outer peripheral wall in the plan view, and is disposed at an upper side of the outer peripheral wall in the state in which the mirror device is installed in the vehicle.

15. The mirror device for a vehicle of claim 12, wherein each rotation gear is disposed at an outer side of the outer peripheral wall in the plan view, and is disposed at an upper side of the outer peripheral wall in the state in which the mirror device is installed in the vehicle.

* * * * *